United States Patent
Hsieh et al.

(10) Patent No.: US 7,722,239 B2
(45) Date of Patent: May 25, 2010

(54) LOGO DISPLAY

(75) Inventors: Shu-Hui Hsieh, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 34 days.

(21) Appl. No.: 11/964,807

(22) Filed: Dec. 27, 2007

(65) Prior Publication Data
US 2009/0067192 A1 Mar. 12, 2009

(30) Foreign Application Priority Data
Sep. 11, 2007 (CN) .................. 2007 1 0201646

(51) Int. Cl.
*F21V 8/00* (2006.01)
*G09F 13/18* (2006.01)

(52) U.S. Cl. .............. 362/612; 362/606; 362/812; 40/546

(58) Field of Classification Search ........... 362/604, 362/606, 612, 812, 26, 27; 40/546
See application file for complete search history.

(56) References Cited

U.S. PATENT DOCUMENTS

| | | | |
|---|---|---|---|
| 7,213,962 B2 * | 5/2007 | Chen ................ 362/27 |
| 7,270,458 B2 * | 9/2007 | Kuo et al. ............ 362/559 |
| 7,360,910 B2 * | 4/2008 | Korral et al. ......... 362/30 |
| 2007/0159850 A1 * | 7/2007 | Yang et al. ........... 362/613 |
| 2007/0230170 A1 * | 10/2007 | Mita et al. ........... 362/231 |
| 2007/0247871 A1 * | 10/2007 | Yoo ...................... 362/612 |
| 2008/0047181 A1 * | 2/2008 | Sakai .................. 40/546 |

FOREIGN PATENT DOCUMENTS

| | | |
|---|---|---|
| CN | 1387174A A | 12/2002 |
| CN | 1414532A A | 4/2003 |
| CN | 1728203A A | 2/2006 |
| CN | 200520053358.7 | 12/2006 |
| DE | 4431667 | * 3/1996 |

* cited by examiner

*Primary Examiner*—Jong-Suk (James) Lee
*Assistant Examiner*—Peggy A. Neils
(74) *Attorney, Agent, or Firm*—Jeffrey T. Knapp

(57) ABSTRACT

A logo display includes a light guide plate including a light emitting surface, a plurality of light emitting diodes (LEDs) optically coupled to the light guide plate, and a light-transmissive layer disposed on the light emitting surface of the light guide plate. A light-transmissive colored pattern is formed on the light-transmissive layer. The light-transmissive colored pattern is configured for filtering out a color component of the light incident on the light-transmissive layer same as a color of the light-transmissive colored pattern.

12 Claims, 4 Drawing Sheets

LOGO DISPLAY

BACKGROUND OF THE INVENTION

1. Field of the Invention

The present invention relates to a logo display, and particularly to a logo display for displaying a logo symbol with light emitted from an LED light source.

2. Description of Related Art

Usually, logo displays can be sorted into a non-luminous type logo display and a luminous type logo display. With respect to the non-luminous type logo display, it cannot be seen and cannot work when there is not enough external light introduced therein.

With respect to the luminous type logo display, it usually adapts a cold cathode fluorescent lamp as a light source. However, the cold cathode fluorescent lamp has several disadvantages, such as, having a large volume preventing a compact design of the logo display, containing mercury which is harmful for the environment, being frangible, and so on.

What is needed, therefore, is a logo display which is environmentally friendly and has a longer operating life.

SUMMARY OF THE INVENTION

A logo display comprises a light guide plate including a light emitting surface, a plurality of light emitting diodes (LEDs) optically coupled to the light guide plate, and a light-transmissive layer disposed on the light emitting surface of the light guide plate. A light-transmissive colored pattern is formed on the light-transmissive layer. The light-transmissive colored pattern is configured for filtering out a color component of the light incident on the light-transmissive layer which is the same as a color of the light-transmissive colored pattern.

Other advantages and novel features of the present invention will become more apparent from the following detailed description when taken in conjunction with the accompanying drawings.

BRIEF DESCRIPTION OF THE DRAWINGS

Many aspects of the present logo display can be better understood with reference to the following drawings. The components in the drawings are not necessarily drawn to scale, the emphasis instead being placed upon clearly illustrating the principles of the present logo display. Moreover, in the drawings, like reference numerals designate corresponding parts throughout the several views.

DETAILED DESCRIPTION OF THE INVENTION

Figure 1:
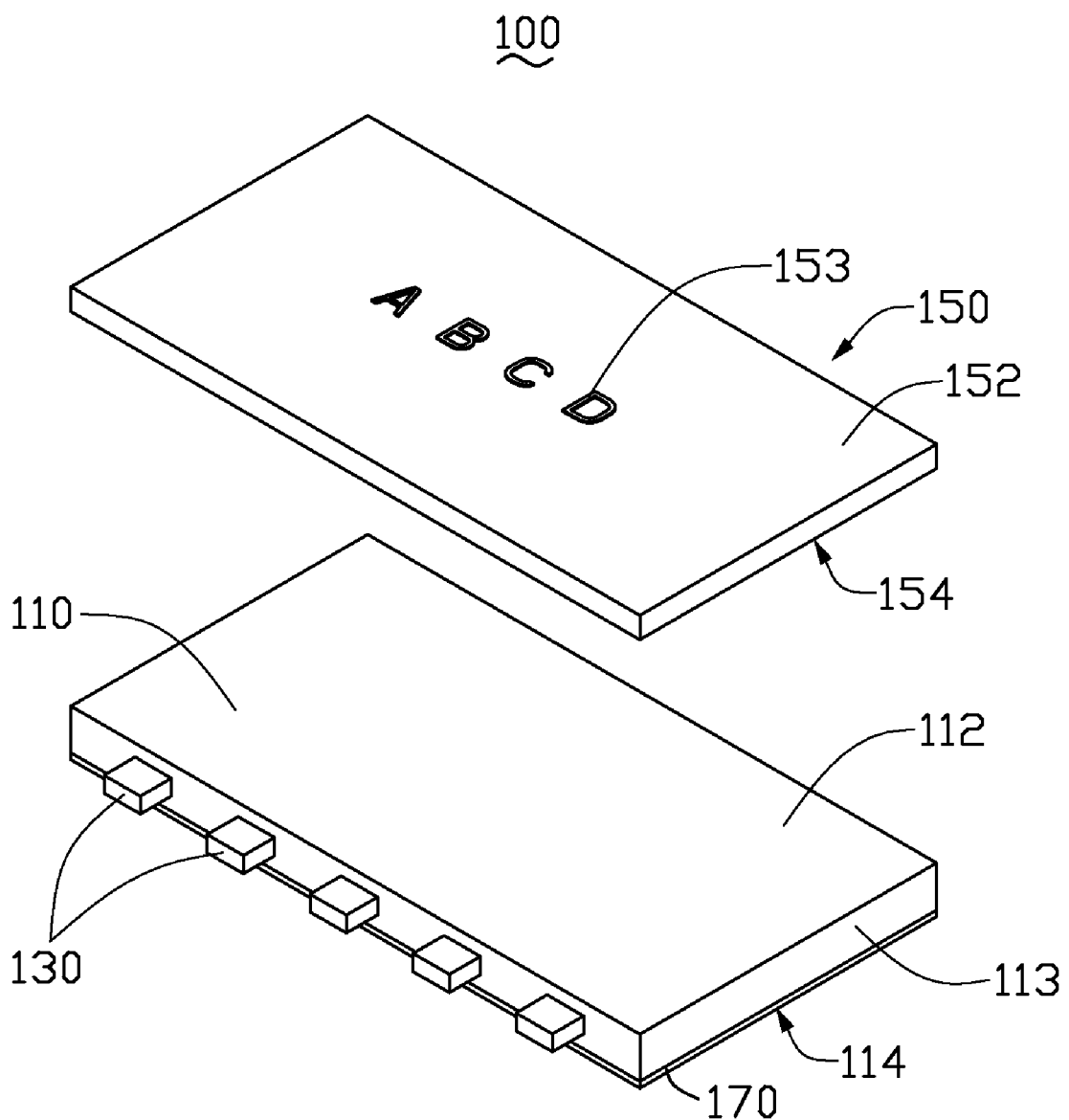
FIG. 1 is an exploded, isometric view of a logo display in accordance with a preferred embodiment of the present invention.

Referring to FIG. 1, a logo display 100 of a preferred embodiment of the invention is illustrated. The logo display 100 comprises a light guide plate 110, a plurality of light emitting diodes (LEDs) 130 and a light-transmissive layer 150.

The light guide plate 110 is made of a light permeable material. In this embodiment, polycarbonate resin is used as the material for the light guide plate 110. Although the material forming the light guide plate 110 is not limited to any particular material, a material which is easy to work and superior in durability is preferably used. For example, acrylic resin, epoxy resin, glass, etc. other than polycarbonate resin may be used.

The light guide plate 110 is substantially a rectangular, transparent plate having a light-emitting surface 112 and an opposite bottom surface 114. A plurality of side surfaces 113 is disposed between the light-emitting surface 112 and the bottom surface 114. The light-emitting surface 112 may be roughened or partially roughened so that uniform distribution of output light on the light-emitting surface 112 can be achieved.

A light reflecting layer 170 is provided on the bottom surface 114. The light reflecting layer 170 is configured for reflecting light back to the light-transmissive layer 150 so as to improve the output light efficiency. The material of the light reflecting layer 170 is not limited to any particular material. For example, metal such as silver, gold, or aluminum, an alloy of these metals, printing ink or the like may be used. Methods such as hot stamping, silk screen printing, painting, etc., may be adopted as the method for forming the light reflecting layer 170.

To make the light guide plate 110 lighter and thinner, the light guide plate 110 may be designed to have a thickness less than 2 centimeters. Preferably, the light guide plate 110 may be designed to have a thickness no larger than 3 millimeters so that the light guide plate 110 is more flexible.

The LEDs 130 are optically coupled to the light guide plate 110, for provision of light, in particular white light. In this embodiment, the LEDs 130 are arranged to face a same side surface 113, which serves as an incident surface of the light guide plate 110. The light emitted from the LEDs 130 is introduced into the light guide plate 110 through the incident surface, and is output through the light-emitting surface 112 towards the light-transmissive layer 150. In another embodiment, the LEDs 130 may be arranged to face several side surfaces 113, and thus the light guide plate 110 has several incident surfaces. In still another embodiment, some of the LEDs 130 may be arranged to face the bottom surface 114, and thus the bottom surface 114 serves as an incident surface of the light guide plate 110.

The light-transmissive layer 150 is positioned adjacent to the light-emitting surface 112 of the light guide plate 110. The light-transmissive layer 150 is made of a light permeable material, such as translucent canvas or transparent resin. The light-transmissive layer 150 comprises a front surface 152 and a rear surface 154. The rear surface 154 is arranged near the light guide plate 110. A light-transmissive colored pattern 153 is formed on the front surface 152. The light-transmissive colored pattern 153 is configured for filtering out a color component of the light incident on the light-transmissive layer 150 which is the same as a color of the light-transmissive colored pattern 153. The light-transmissive colored pattern 153 is formed on the front surface 152 via painting or printing. In another embodiment the light-transmissive colored pattern 153 may he formed on the rear surface 154 near the light guide plate 110.

As shown in FIG. 1, the light-transmissive colored pattern 153 has four English characters including ABCD, which can be selected to have the same or different colors to meet the demands of practical applications. Furthermore, the light-transmissive colored pattern 153 may include Chinese characters, pictures etc., other than English characters.

Figure 2:
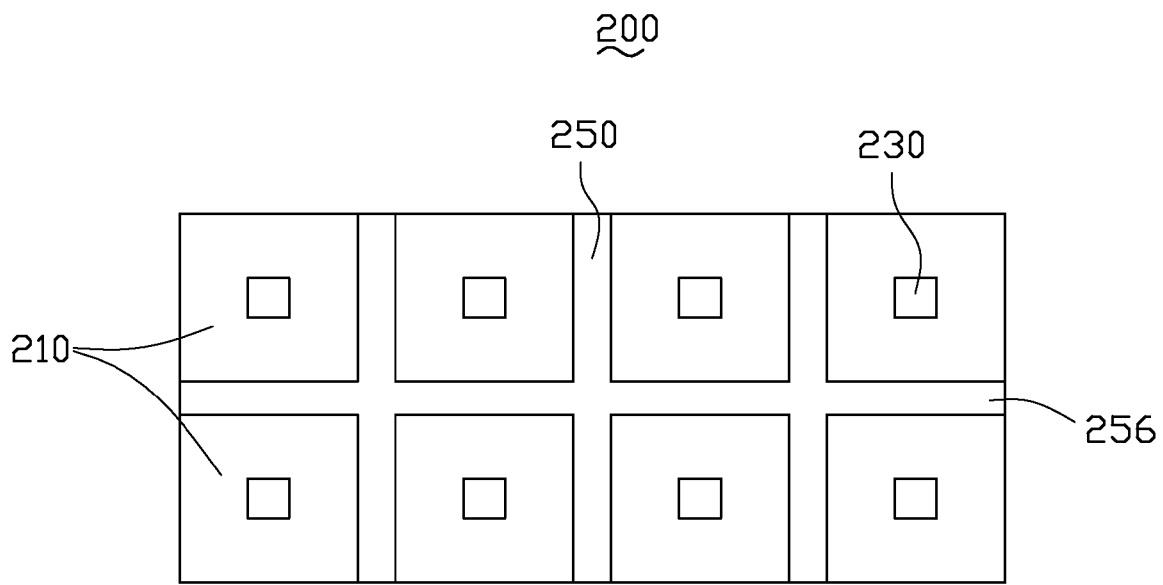
FIG. 2 is a plan view of a logo display in accordance with another preferred embodiment of the present invention.
Figure 3:
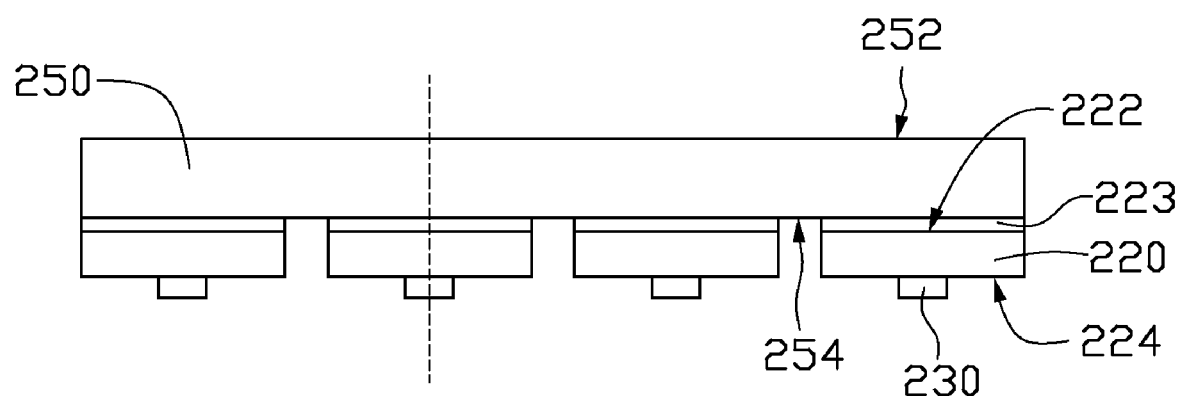
FIG. 3 is a side elevational view of FIG. 2.

FIGS. 2-3 show a logo display 200 of another preferred embodiment of the invention. The logo display 200 comprises a light guide plate 210, a plurality of LEDs 230, and a light-transmissive layer 250.

The light guide plate 210 comprises a plurality of light guide units 220. Each light guide unit 220 comprises a first surface 222 and an opposite second surface 224. The first surfaces 222 of the light guide units 220 are attached to the light-transmissive layer 250 and together form a light emitting surface of the light guide plate 210. In detail, the first surfaces 222 are attached to the light-transmissive layer 250 using an adhesive 223 with a high transparency, that is, with a high light conductivity.

The light guide units 220 are arranged on the light-transmissive layer 250 at a predetermined interval (pitch) so that the logo display 200 can be folded, winded and packed. Preferably, a plurality of channels 256 is defined between two adjacent light guide units 220, and has a width not less than the sum of the thicknesses of the two adjacent light guide units 220. It can be understood that the light guide units 220 can be arranged on the light-transmissive layer 250 in a manner that each light guide unit 220 contacts neighbouring light guide units 220. Since the light guide plate 210 is pieced together from a plurality of single light guide units 220, the size of the light guide plate 210 can be adjusted via increasing or decreasing the number of light guide units 220 to meet the demands of practical applications.

Figure 4:
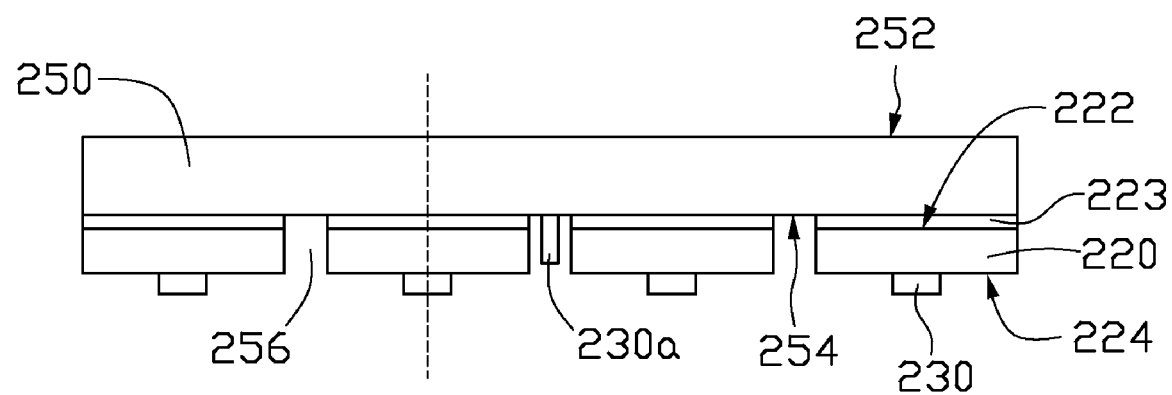
FIG. 4 is a side elevational view of a logo display in accordance with another preferred embodiment of the present invention.

The LEDs 230 are optically coupled to the light guide plate 210 in such a manner that each LED 230 is attached to the geometric center of a bottom surface of an associated light guide unit 220. The light emitted from the LEDs 230 is introduced into the light guide plate 210 through the associated light guide units 220, and finally is radiated outward towards the light-transmissive layer 250. It can be understood that the number of LEDs 230 attached to each light guide unit 220 is a matter of design, and can be two or more according to the demands of practical applications. It can be further understood that some LEDs 230a may be positioned at a lateral side of the associated light guide units 220, as shown in FIG. 4. In other words, the LEDs 230a may be positioned in the channels 256 between adjacent light guide units 220.

The light-transmissive layer 250 is formed of a light permeable material, such as translucent canvas or transparent resin. The light-transmissive layer 250 comprises a first surface 252 and an apposite second surface 254. The second surface 254 of the light-transmissive layer 250 is attached to the light guide plate 210. A light-transmissive colored pattern (not shown) is formed on the first surface 252 of the light-transmissive layer 250. When the LEDs 230 are powered to produced light, the light is introduced into the light guide plate 210 and travels to the light-transmissive colored pattern. The light-transmissive colored pattern filters out a color component of the light incident on the light-transmissive layer 250 which is the same as a color of the light-tranmissive colored pattern. As a result, the light-transmissive colored. pattern is observed.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A logo display comprising:
   a light guide plate including a light emitting surface;
   a plurality of light emitting diodes (LEDs) optically coupled to the light guide plate; and
   a light-transmissive layer disposed on the light emitting surface of the light guide plate, a light-transmissive colored pattern formed on the light-transmissive layer;
   wherein the light-transmissive colored pattern is configured for filtering out a color component of the light incident on the light-transmissive layer which is the same as a color of the light-transmissive colored pattern; and
   wherein the light guide plate comprises a plurality of light guide units each comprising a first surface and an opposite second surface, the first surfaces of the light guide units are attached to the light-transmissive layer and together form the light emitting surface of the light guide plate, and each light guide unit is optically coupled to at least one of the LEDs.

2. The logo display as described in claim 1, wherein the light guide plate is formed of light permeable material.

3. The logo display as described in claim 1, wherein the light guide plate has a thickness less than 2 centimeters.

4. The logo display as described in claim 3, wherein the light guide plate has a thickness not larger than 3 millimeters.

5. The logo display as described in claim 1, wherein the LEDs are configured for emitting white light.

6. The logo display as described in claim 1, wherein the light-transmissive colored pattern is formed on a surface of the light-transmissive layer away from the light guide plate.

7. The logo display as described in claim 1, wherein the light guide units are attached to the light-transmissive layer at a predetermined pitch.

8. The logo display as described in claim 7, wherein a plurality of channels are defined between adjacent light guide units, and some of the LEDs are positioned in the channels and optically coupled to the light guide units.

9. The logo display as described in claim 7, wherein a plurality of channels are defined between adjacent light guide units, and each channel has a width not less than the sum of the thicknesses of the two adjacent light guide units.

10. The logo display as described in claim 1, wherein the LEDs are attached to geometric centers of the second surfaces of the associated light guide units.

11. The logo display as described in claim 1, wherein the first surfaces of the light guide units are attached to the light-transmissive layer using an adhesive with a high transparency.

12. The logo display as described in claim 9, wherein the logo display is configured for being folded.

* * * * *